United States Patent
Yokotani et al.

(10) Patent No.: US 6,977,497 B1
(45) Date of Patent: Dec. 20, 2005

(54) MAGNETIC DETECTOR

(75) Inventors: Masahiro Yokotani, Tokyo (JP); Izuru Shinjo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/990,391

(22) Filed: Nov. 18, 2004

(30) Foreign Application Priority Data

Jul. 14, 2004 (JP) .............................. 2004-206859

(51) Int. Cl.$^7$ ............... G01P 3/54; G01B 7/14; G01B 7/30
(52) U.S. Cl. ................. 324/207.21; 324/207.25; 324/174
(58) Field of Search ............... 324/207.2, 207.21, 324/207.22, 207.23, 207.24, 207.25, 207.26, 324/166, 173, 174, 179

(56) References Cited

U.S. PATENT DOCUMENTS

| | | | |
|---|---|---|---|
| 6,211,669 B1 * | 4/2001 | Yokotani et al. | 324/207.21 |
| 6,870,365 B1 * | 3/2005 | Yokotani et al. | 324/207.25 |
| 2003/0173955 A1 * | 9/2003 | Uenoyama | 324/207.21 |
| 2004/0017188 A1 * | 1/2004 | Yokotani et al. | 324/207.21 |
| 2004/0027712 A1 | 2/2004 | Yokotani et al. | |

FOREIGN PATENT DOCUMENTS

JP  11-183197 A  7/1999

* cited by examiner

*Primary Examiner*—Edward Lefkowitz
*Assistant Examiner*—David M Schindler
(74) *Attorney, Agent, or Firm*—Sugrue Mion, PLLC

(57) ABSTRACT

A magnetoelectric converting element is constructed by four or more magnetic resistance segments symmetrically arranged at a predetermined pitch with respect to the central line of a magnet perpendicular to the rotating direction of a magnetic moving body. The magnetizing direction of the magnet is set to the direction perpendicular to the direction opposed to the magnetic moving body. Further, $0.7P \leq X \leq P$ and $P \leq Y \leq 1.6P$ are set when the size of the magnet in the moving direction of the magnetic moving body is set to X and the size of the magnet in the direction opposed to the magnetic moving body is set to Y and the pitch of the magnetic resistance segments at both ends constituting the magnetoelectric converting element is set to P.

2 Claims, 4 Drawing Sheets

$X \leq P, Y \geq P$

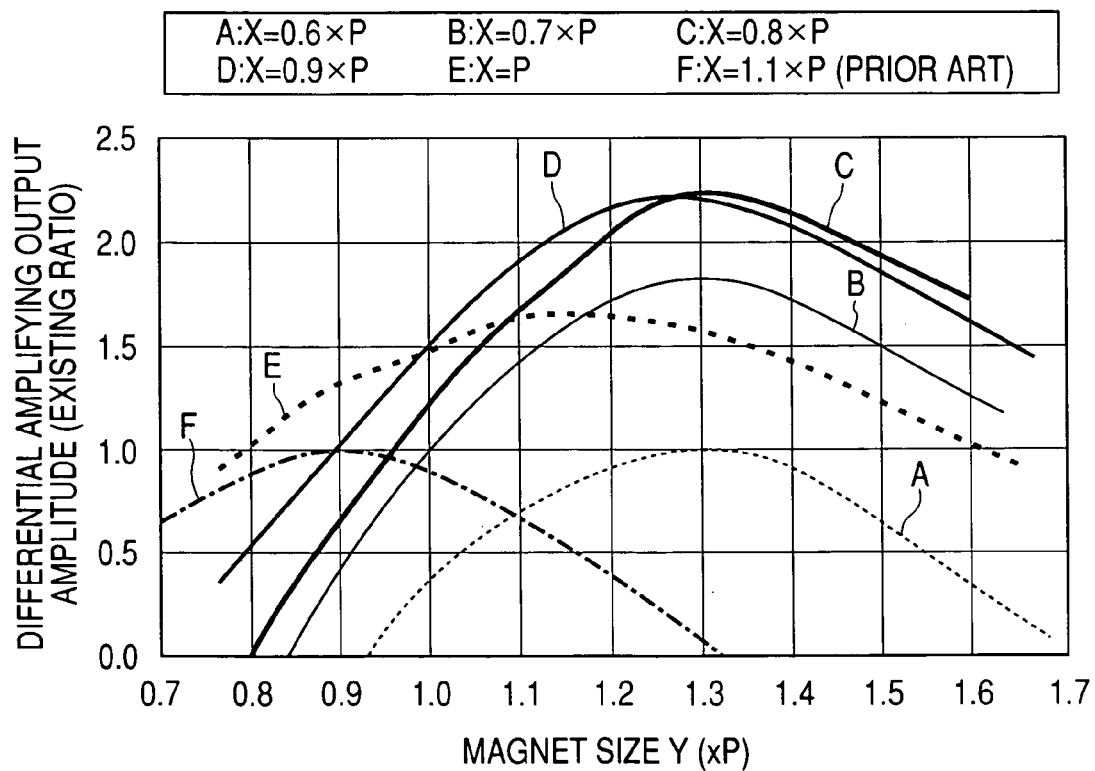

MAGNETIC DETECTOR

BACKGROUND OF THE INVENTION

1. Field of the Invention

This invention relates to a magnetic detector able to detect the rotating position of a magnetic moving body by using a magnetoelectric converting element.

2. Description of the Related Art

As shown in patent literature 1, the conventional magnetic detector using the magnetoelectric converting element has a magnetic moving body having a shape for changing a magnetic field, a magnet, and a processing circuit section. The magnet is arranged so as to be opposed to the magnetic moving body, and is magnetized in the rotating axis direction of the magnetic moving body. In the processing circuit section, first to fourth magnetic resistance segments are integrally constructed and are arranged at a predetermined interval in the rotating direction of the magnetic moving body. The first and second magnetic resistance segments constitute a bridge circuit, and the third and fourth magnetic resistance segments constitute a bridge circuit.

The magnetic field from the magnet applied to each magnetic resistance segment is changed by rotating the magnetic moving body. As its result, the resistance value of each magnetic resistance segment is changed correspondingly to the shape of the magnetic moving body, and a differential amplifying output of a middle point output of the first and second magnetic resistance segments, and a middle point output of the third and fourth magnetic resistance segments is obtained. This differential amplifying output is then shaped in waveform, and a final output signal corresponding to the shape of the magnetic moving body can be obtained.

[Patent literature 1] JP-A-2004-109113 (paragraphs 0007-0010 and FIGS. 3 and 4).

In the above conventional magnetic detector, the differential amplifying output is dispersed by dispersion of the resistance value of the magnetic resistance segment, dispersion of a temperature coefficient of the magnetic resistance segment, or position dispersion generated at an assembly time, etc. As its result, a problem exists in that dispersion is generated in the final output.

SUMMARY OF THE INVENTION

In consideration of such points, an object of this invention is to provide a magnetic detector able to reduce the dispersion of characteristics due to the dispersion of the resistance value of the magnetic resistance segment, the dispersion of the temperature coefficient of the magnetic resistance segment, or the position dispersion generated at the assembly time, etc., and improve a noise resisting amount and obtain preferable detecting performance.

This invention resides in a magnetic detector comprising a magnetic moving body connected to a detected object, a magnet arranged so as to be opposed to this magnetic moving body, and a magnetoelectric converting element constructed by plural magnetic resistance segments arranged at a predetermined pitch along a rotating direction of the magnetic moving body, and detecting a change in application magnetic intensity caused by the rotation of the magnetic moving body by means of the magnetoelectric converting element;

wherein the magnetoelectric converting element is constructed by four or more magnetic resistance segments symmetrically arranged at a predetermined pitch with respect to a central line of the magnet perpendicular to the rotating direction of the magnetic moving body;

the magnetizing direction of the magnet is set to the direction perpendicular to the direction opposed to the magnetic moving body; and $0.7P \leq X \leq P$ and $P \leq Y \leq 1.6P$ are set when the size of the magnet in the moving direction of the magnetic moving body is set to X and the size of the magnet in the direction opposed to the magnetic moving body is set to Y and the pitch of the magnetic resistance segments at both ends constituting the magnetoelectric converting element is set to P.

In accordance with the rotating detector of this invention, the SN ratio can be improved by setting the pitch P of the magnetic resistance segments at both ends constituting the magnetoelectric converting element, the size X of the magnet in the moving direction of the magnetic moving body, and the size Y of the magnet in the direction opposed to the magnetic moving body to a predetermined relation. Further, the dispersion of characteristics due to the dispersion of the magnetic resistance segment can be reduced and the noise resisting amount can be also improved and preferable detecting performance can be obtained.

BRIEF DESCRIPTION OF THE DRAWINGS

FIG. 4 is a characteristic view showing the relation of a magnet size and a differential amplifying output amplitude in the embodiment mode 1.

DESCRIPTION OF THE PREFERRED EMBODIMENTS

Embodiment Mode 1

Figure 1A:
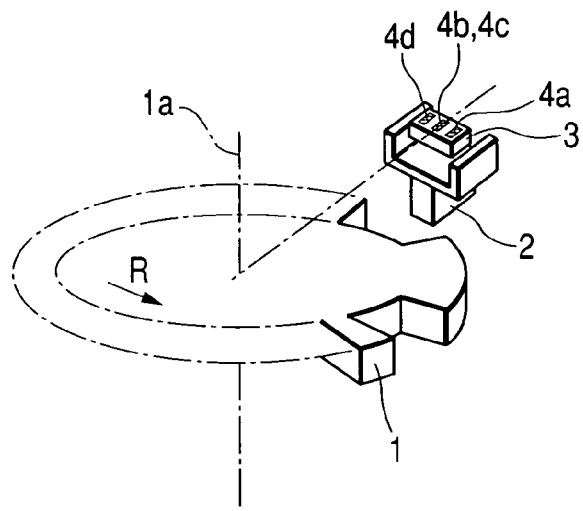
FIGS. 1A–C are views showing the construction of a magnetic circuit in an embodiment mode 1 of this invention.
Figure 1B:
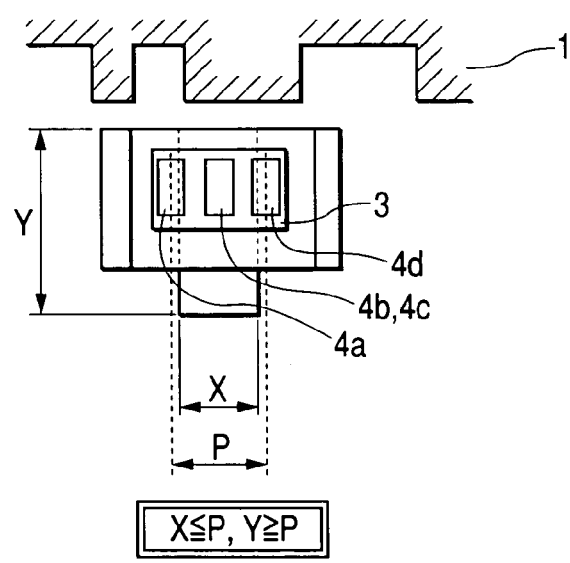
Figure 1C:
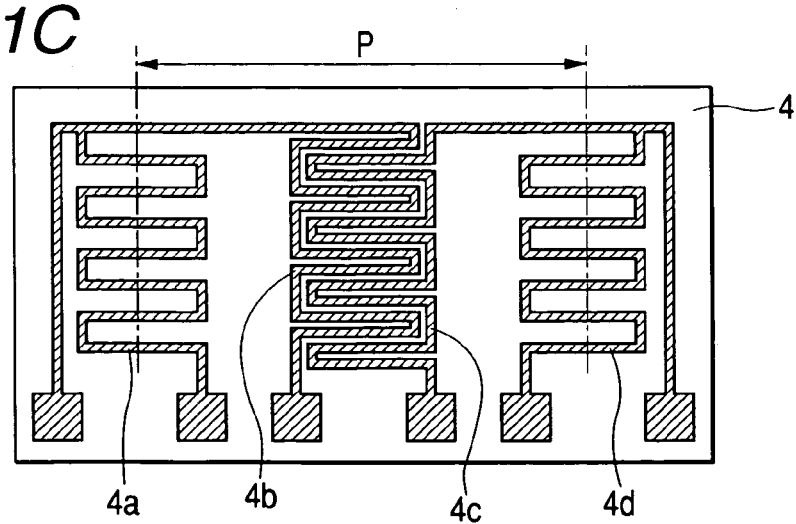

FIG. 1 is a constructional view showing a rotating detector of an embodiment mode 1 of this invention. FIG. 1A is a perspective view of the rotating detector. FIG. 1B is a top view of the rotating detector. FIG. 1C is a pattern view of a GMR element segment.

This rotating detector has a magnetic moving body 1 of a gear shape having a shape for changing a magnetic field, a magnet 2 and a signal processing circuit section 3. The magnet 2 is arranged so as to be opposed to the magnetic moving body 1, and is magnetized in the direction perpendicular to the direction opposed to the magnetic moving body 1, i.e., in the rotating axis direction 1a of the magnetic moving body 1. A magnetoelectric converting element 4 constructed by four GMR element segments 4a to 4d arranged at a predetermined pitch along the rotating direction of the magnetic moving body 1 is formed in the signal processing circuit section 3.

Each of these four GMR element segments 4a to 4d is formed by a film in the signal processing circuit section 3 constructed by an IC chip, and is symmetrically arranged along the rotating direction (arrow R) of the magnetic moving body 1 with respect to the central line of the magnet 2 perpendicular to this rotating direction. Further, two GMR element segments 4b, 4c in the central portion among these four GMR element segments 4a to 4d are formed so as to cross in a comb teeth shape on the central line of the magnet 2.

When the pitch of the GMR element segments 4a, 4d at both ends constituting the magnetoelectric converting element 4 is set to P, the relation of this pitch and the size X of the magnet 2 in the moving direction of the magnetic moving body 1 is set so as to satisfy the range of $0.7P \leq X \leq P$, and the relation of the size Y of the magnet 2 in the direction opposed to the magnetic moving body 1 and the pitch P of the GMR element segment is set so as to satisfy the range of $P \leq Y \leq 1.6P$.

Further, as described later, the pairs of GMR element segments 4a, 4b and GMR element segments 4c, 4d having pitch centers symmetrically arranged mutually with respect to the central line of the magnet 2 are connected so as to form a bridge circuit.

The GMR element (big magnetic resistance element) is a laminating body, a so-called artificial grating film in which a magnetic layer having a thickness from several angstroms to several ten angstroms and a nonmagnetic layer are alternately laminated. (Fe/CR)n, (permalloy/Cu/Co/Cu)n and (Co/Cu)n are known as the GMR element. This GMR element has a very large magnetic resistance effect (MR changing ratio) in comparison with the conventional magnetic resistance element, and depends on only the relative angle of a magnetizing direction of an adjacent magnetic layer. Accordingly, this GMR element is an in-plane magnetic sensing element in which the same resistance value change is obtained even when the direction of the external magnetic field has any angle difference with respect to an electric current. The GMR element is also an element able to add an anisotropic property by narrowing the width of a magnetic resistance pattern (n is a laminating number). Further, the GMR element is an element having features in which hysteresis exists in the resistance value change due to the change of the applied magnetic field and temperature characteristics, particularly, a temperature coefficient is large.

Figure 2:
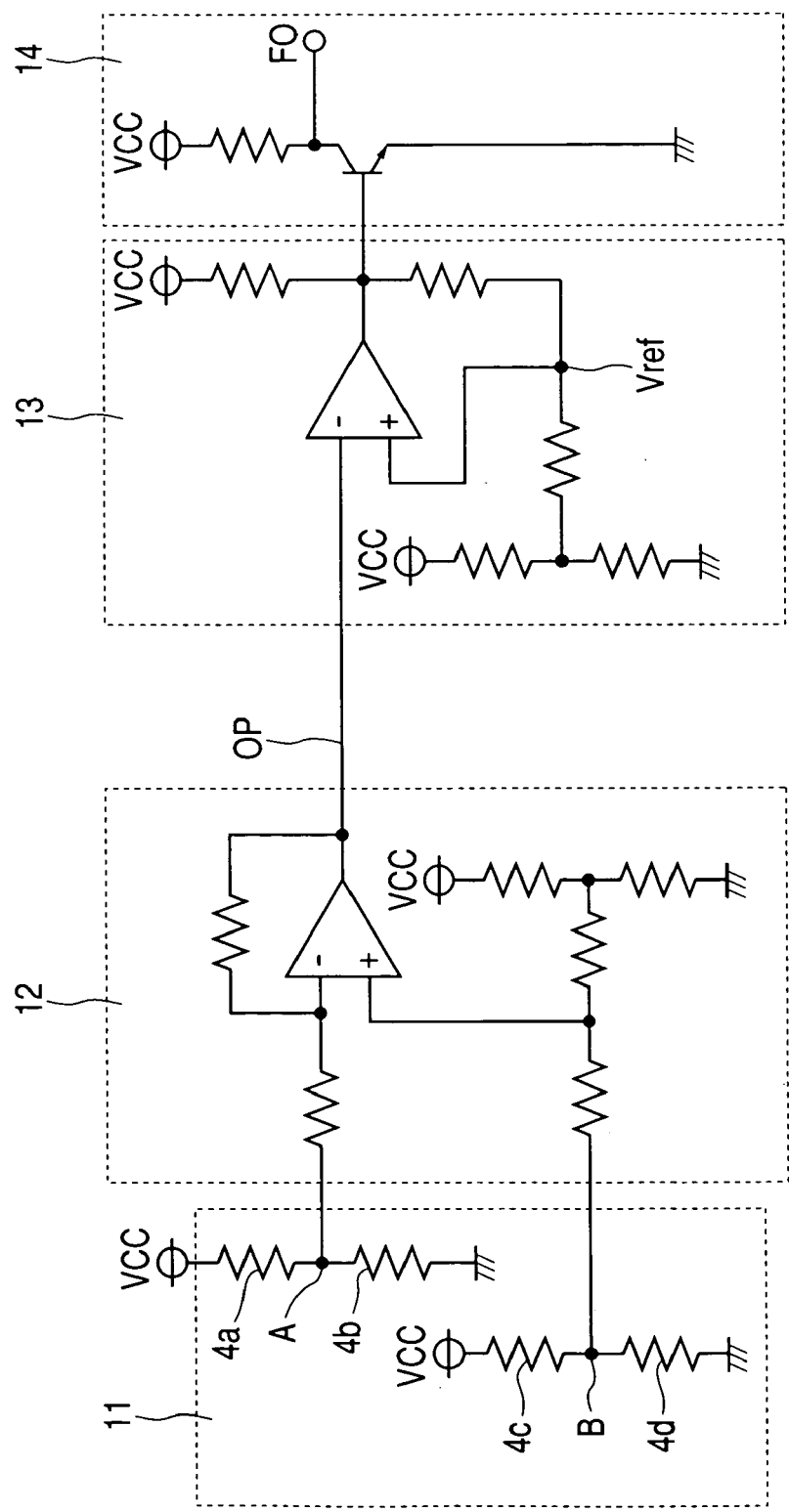
FIG. 2 is a view showing the circuit construction of a signal processing circuit section in the embodiment mode 1.

FIG. 2 is a view showing the circuit construction of the signal processing circuit section. A constant voltage is applied to the bridge circuit 11 constructed by the GMR element segments 4a to 4d, and the resistance value change of the GMR element segment due to the change of the magnetic field is converted into a voltage change. Respective middle point outputs A and B converted into voltages are amplified as a differential amplifying output OP in an amplifying circuit 12, and are inputted to a comparing circuit 13. The waveform of a signal compared with a predetermined voltage Vref by the comparing circuit 13 is shaped by an output circuit 14, and this signal is converted into a final output FO corresponding to the shape of the magnetic moving body 1.

A similar operation is performed even when one pair among the above four GMR element segments 4a, 4b and 4c, 4d, e.g., the GMR element segments 4a, 4b or 4c, 4d are set to fixed resistors and the bridge circuit 11 is constructed.

Figure 3A:
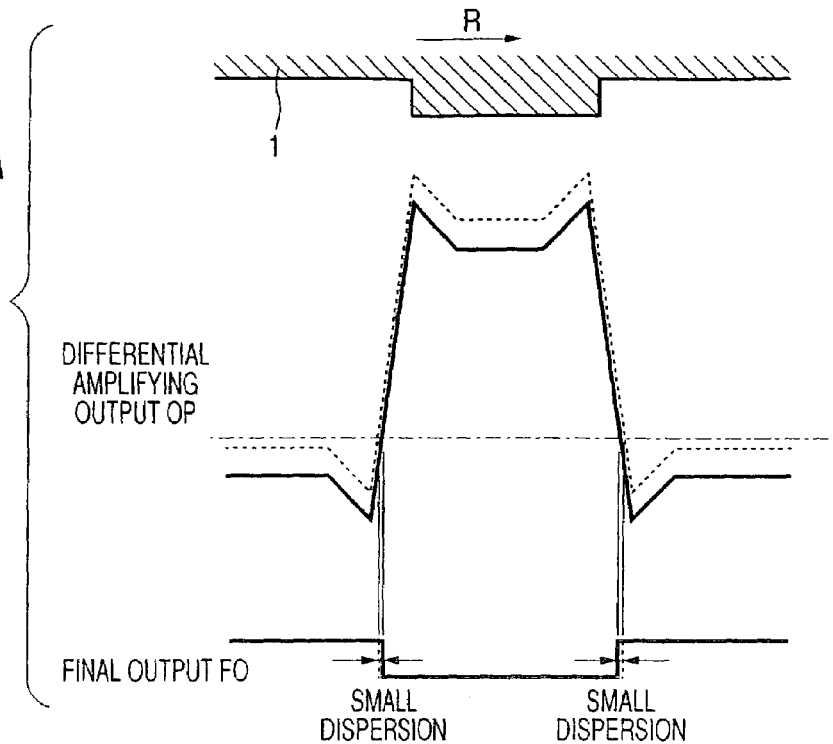
FIGS. 3A–B are views showing signal waveforms in the embodiment mode 1 and the conventional case.
Figure 3B:
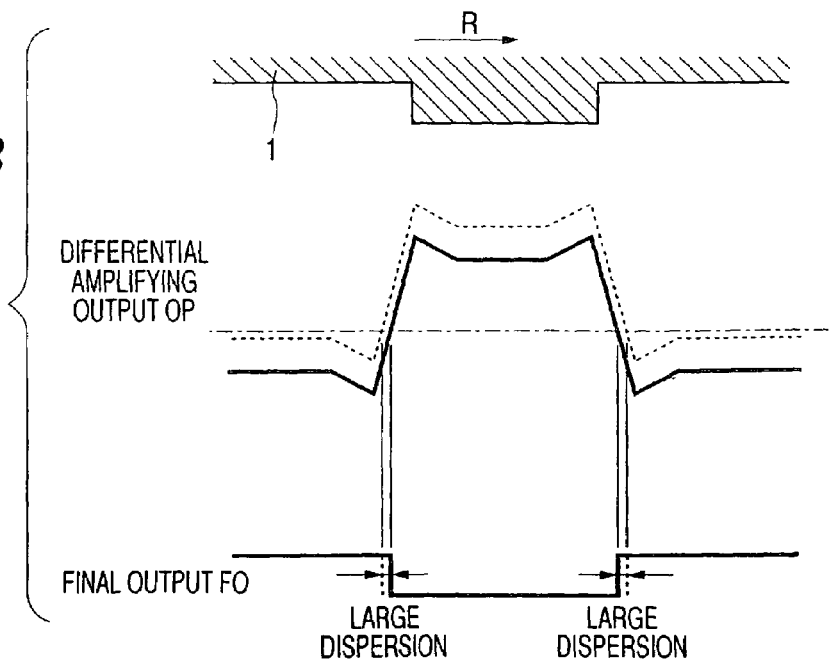

FIG. 3 is a waveform chart showing the differential amplifying output OP and the final output FO. FIG. 3A shows the differential amplifying output OP and the waveform of the final output FO when dispersion is caused in the resistance values and the temperature coefficients of the GMR element segments 4a to 4d constituting the magnetoelectric converting element 4 in the case of the embodiment mode 1 of this invention. FIG. 3B shows the differential amplifying output OP and the waveform of the final output FO in the conventional case.

FIG. 4 is a characteristic view showing the change of the differential amplifying output amplitude with respect to the pitch P of the GMR element segments at both ends constituting the magnetoelectric converting element 4 and the magnet sizes X and Y. In FIG. 4, A shows the case of X=0.6×P, B the case of X=0.7×P, C the case of X=0.8×P, D the case of X=0.9×P, E X=P, and F shows the case of X=1.1×P (conventional example). Further, the differential amplifying output amplitude of the ordinate axis shows an output ratio when a peak output (near 0.9P in the magnet size Y in FIG. 4) of F (X=1.1×P) in the conventional example is set to 1.

As shown in FIG. 4, if the relation of the size X of the magnet 2 in the moving direction of the magnetic moving body and the pitch P of the GMR element segment is set to the range of $0.7P \leq X \leq P$ and the relation of the size Y of the magnet 2 in the direction opposed to the magnetic moving body and the pitch P of the GMR element segment is set to the range of $P \leq Y \leq 1.6P$, it is known that the differential amplifying output amplitude is increased in comparison with F (X=1.1×P). Accordingly, as shown in FIG. 3A, it is known that the dispersions of the differential amplifying output OP and the final output FO in the case of this invention can be reduced in comparison with the conventional case shown in FIG. 3B.

As mentioned above, in this invention, the SN ratio can be improved by setting the magnetizing direction of the magnet to the direction perpendicular to the direction opposed to the magnetic moving body, and setting $0.7P \leq X \leq P$ and $P \leq Y \leq 1.6P$ when the size of the magnet in the moving direction of the magnetic moving body is set to X and the size of the magnet in the direction opposed to the magnetic moving body is set to Y and the pitch of the magnetic resistance segments at both ends constituting the above magnetoelectric converting element is set to P. Further, the dispersion of characteristics due to the dispersion of the GMR element segment can be reduced and the noise resisting amount can be also improved and preferable detecting performance can be obtained.

What is claimed is:

1. A magnetic detector comprising a magnetic moving body connected to a detected object, a magnet arranged so as to be opposed to this magnetic moving body, and a magnetoelectric converting element constructed by plural magnetic resistance segments arranged at a predetermined pitch along a rotating direction of said magnetic moving body, and detecting a change in magnetic intensity caused by the rotation of said magnetic moving body by means of said magnetoelectric converting element;

wherein said magnetoelectric converting element is constructed by four or more magnetic resistance segments symmetrically arranged at a predetermined pitch with respect to a central line of said magnet perpendicular to the rotating direction of said magnetic moving body;

the magnetizing direction of said magnet is set to the direction perpendicular to the direction opposed to said magnetic moving body; and $0.7P \leq X \leq P$ and $P \leq Y \leq 1.6P$ are satisfied, where the size of said magnet in the moving direction of said magnetic moving body is set to X and the size of said magnet in the direction opposed to said magnetic moving body is set to Y and the pitch of the magnetic resistance segments at both ends constituting said magnetoelectric converting element is set to P.

2. The magnetic detector according to claim 1, wherein the magnetoelectric converting element is a giant magnetic resistance (GMR) element.

* * * * *